United States Patent [19]

Iwamura et al.

[11] Patent Number: 5,260,838

[45] Date of Patent: Nov. 9, 1993

[54] MAGNETIC REPRODUCING APPARATUS FOR REPRODUCING A VIDEO SIGNAL FROM A MAGNETIC RECORDING MEDIUM

[75] Inventors: Soichi Iwamura, Fuchu; Hiroaki Nogami, Matsudo, both of Japan

[73] Assignee: Sharp Kabushiki Kaisha

[21] Appl. No.: 708,927

[22] Filed: May 31, 1991

[30] Foreign Application Priority Data

Jun. 4, 1990 [JP]  Japan .................................. 2-146503

[51] Int. Cl.$^5$ .............................................. H04N 5/92
[52] U.S. Cl. ...................................... 360/36.1; 358/330
[58] Field of Search ................... 360/36.1, 30; 358/330, 358/337

[56] References Cited

U.S. PATENT DOCUMENTS

| | | | |
|---|---|---|---|
| 4,591,930 | 5/1986 | Baumeister | 360/35.1 |
| 4,819,086 | 4/1989 | Hayashi et al. | 358/330 X |
| 4,839,615 | 6/1989 | Sato | 332/18 |
| 4,843,334 | 6/1989 | Ishikawa | 329/122 |
| 5,045,950 | 6/1991 | Iwamura et al. | 358/319 |
| 5,157,359 | 10/1992 | Nogami et al. | 360/30 X |

FOREIGN PATENT DOCUMENTS

| | | |
|---|---|---|
| 0289046 | 11/1988 | European Pat. Off. . |
| 63-185177 | 7/1988 | Japan . |
| 63-274290 | 11/1988 | Japan . |

OTHER PUBLICATIONS

Patent Abstracts of Japan, Publication No. JP61140287, Publication Date Jun. 1986.
Patent Abstracts of Japan, Publication No. JP 56066907, Publication Date Jun. 1981.
Patent Abstracts of Japan, Publication No. JP20766305, Publication Date Mar. 1990.

Primary Examiner—Edward P. Westin
Assistant Examiner—John R. Lee
Attorney, Agent, or Firm—David G. Conlin; Robert F. O'Connell

[57] ABSTRACT

An FM carrier is FM-modulated with a video signal for recordal on a magnetic medium. The phase of the FM carrier corresponding to a tip portion of a horizontal synchronizing pulse in the video signal is reset to, and the phase is fixed at, a reference phase at a leading edge of the horizontal synchronizing pulse and is fixed during every period of the horizontal synchronizing pulse width. In reproducing the video signal, the FM carrier, with its frequency doubled, is demodulated by a pulse count type FM demodulator having a frequency-doubling function. The FM carrier is always maintained in phase with the horizontal synchronizing pulse in the video signal, so that beat stripes or moire do not appear on the reproduced picture, and interference due to the leakage appears as reproduced picture distortion in correlation with the video signal. A reference burst signal necessary to a time base correction is extracted from the reproduced FM carrier.

10 Claims, 8 Drawing Sheets

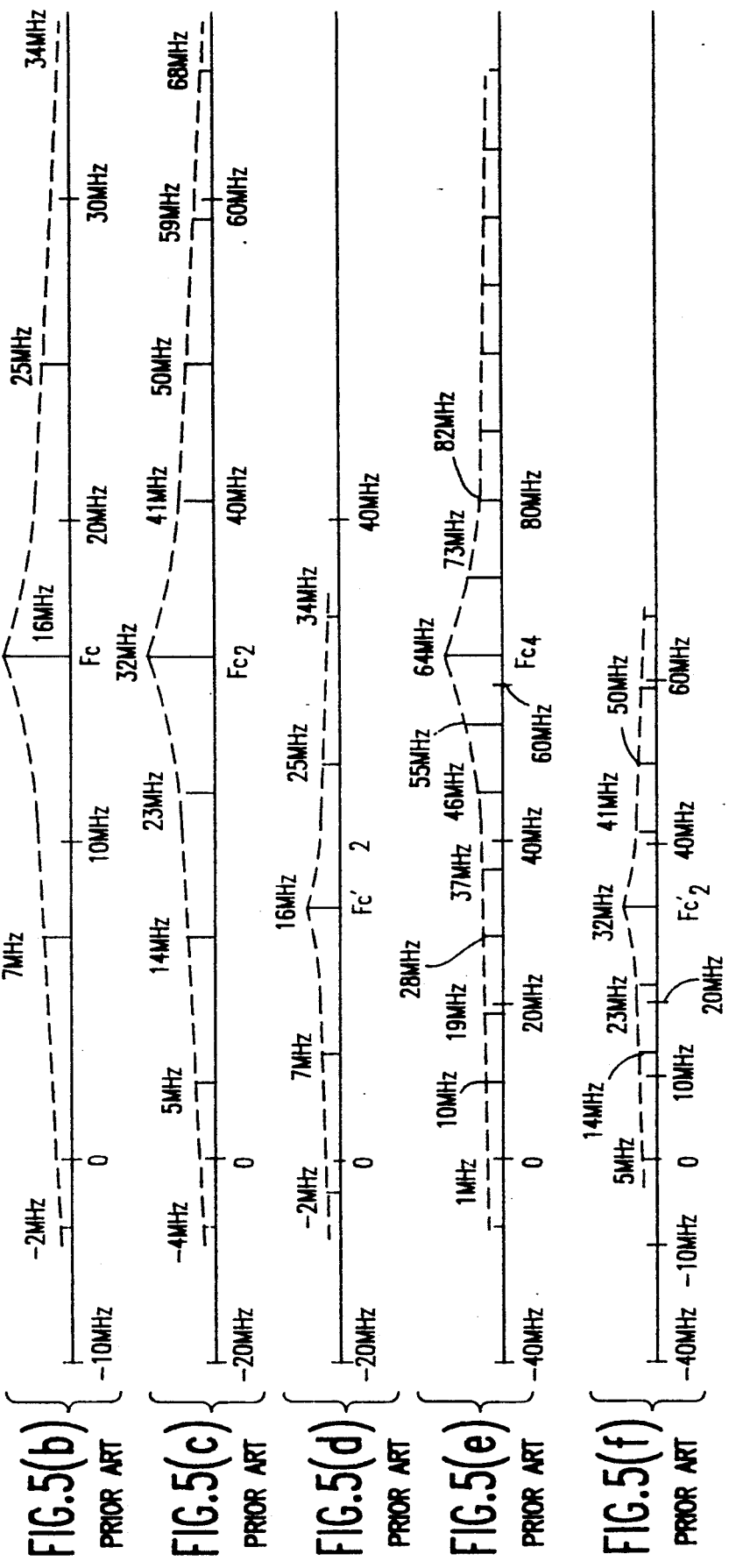

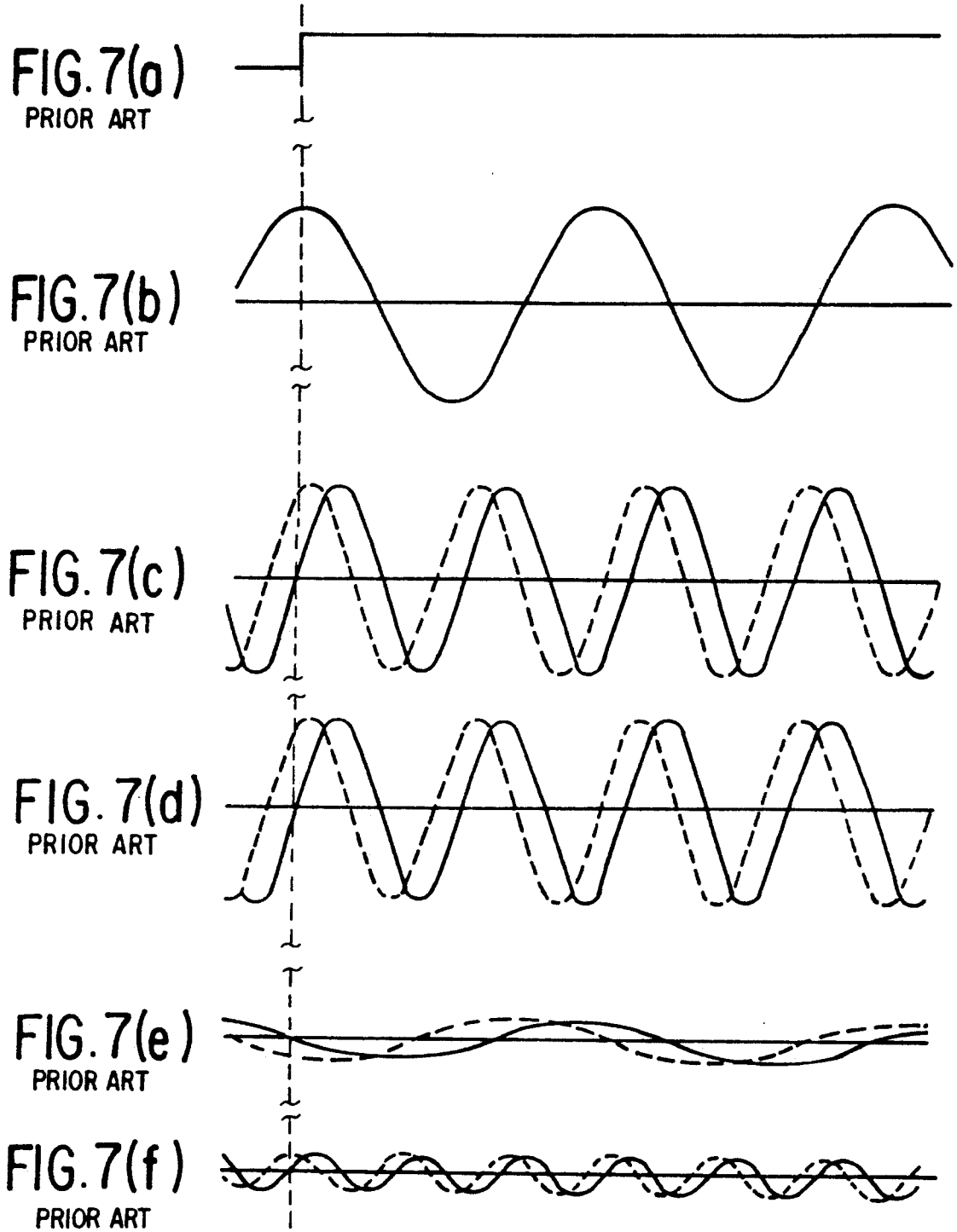

MAGNETIC REPRODUCING APPARATUS FOR REPRODUCING A VIDEO SIGNAL FROM A MAGNETIC RECORDING MEDIUM

CROSS-REFERENCE TO RELATED APPLICATION

The present application is related to application Ser. No. 667,941 filed on Mar. 12, 1991 now U.S. Pat. No. 5,157,359.

BACKGROUND OF THE INVENTION

1. Field of the Invention

The present invention relates to magnetic recording/reproducing apparatus, and more particularly to magnetic recording/reproducing apparatus for recording/reproducing broad-band video signals such as HDTV (High Definition Television) signals.

2. Description of the Background Art

Conventionally, there is no relationship between the phase of a video signal and the phase of a carrier FM-modulated with the video signal (hereinafter, referred to as FM carrier) in FM recording/reproducing of a video signal. Accordingly, in reproducing, even a part of the lower sideband of the FM carrier slightly leaks into the band of a FM demodulation video signal and, it damages the picture stability as beat stripes or moiré (stripe-like noise due to the beat interference). That is to say, so-called beat stripe drifts occur on a screen. A human being is very sensitive in detecting the beat stripe which produces dynamic distortion. For example, even when the amplitude of a leaking portion of a lower sideband of the FM carrier (a peak-peak value) which is a cause of the beat stripe is about 1/200 of the amplitude (a peak-peak value) of a video signal (0.5%, −46 dB), the beat stripe is detectable. Generally it is said that the DU ratio (Desired-to-Undesired Signal Ratio) of about +35 dB is the allowable threshold permittable as to home VTR products.

Now, referring to the wave form diagram of FIG. 7, the occurrence of the beat stripe due to fluctuation of the difference between the phase of FM carrier and the phase of horizontal synchronizing signal will be described below in detail.

Generally, it is known that when a carrier is FM-modulated with a video signal e(t), as shown by the following expression, an infinite number of sidebands are produced for every angular frequency $\omega_p$;

$$e(t)_{FM} = A_N \Sigma J_N(m) \sin[(\omega_C + N\omega_P) + \alpha]$$

In the above expression, $J_N(m)$ indicates the Bessel function of the first kind, $\omega_C$ indicates the angular frequency of a video signal, $\alpha$ indicates the angular frequency of FM carrier, $\alpha$ indicates a value obtained by measuring the phase of the FM carrier (frequency) signal with a reference of a leading edge or a trailing edge of the horizontal synchronizing pulse, and N indicates an integer from $-\infty$ to $+\infty$.

FIG. 7 (a) shows the reference phase of a rise in the leading edge or the trailing edge of a horizontal synchronizing pulse. FIG. 7 (b) shows video signal. The video signal is always in synchronization with the horizontal synchronizing pulse. The solid line in FIG. 7 (c) indicates a waveform of the FM carrier at the reference phase, or $\alpha=0$. The basic wave spectrum of the FM carrier is shown in FIG. 7 (d). The first lower sideband and the first upper sideband of the FM carrier are shown in FIGS. 7 (e) and (f), respectively As clearly seen from FIGS. 7 (d)-(f), the phases of each of the basic wave spectrum, the first lower sideband, and the first upper sideband of the FM carrier are all in synchronization with the reference phase of the leading edge or the trailing edge of the horizontal synchronizing signal. Accordingly, by always maintaining the phase relationship, the phase of the spectrum of the lower sideband which is a cause of the beat stripe occurrence is in synchronization with the horizontal synchronization pulse, resulting in no beat stripes "drifting" on the screen.

On the other hand, if the phase of the FM carrier shifts by 90° ($\alpha=90°$), for example, with respect to the reference phase of the horizontal synchronizing pulse as shown by the broken line in FIG. 7 (c), the phase of the spectrum of the first lower sideband and the phase of the spectrum of the first upper sideband also shift by 90° accordingly as shown by the broken lines in FIGS. 7 (d), (e) and (f). As a result, if the spectrum of the first lower sideband invades into the band of the demodulated video signal, due to fluctuation in phase $\alpha$, the beat stripes appear to drift on the screen. The video signal is always in synchronization with the horizontal synchronizing signal as shown in FIG. 7 (b).

Referring to FIGS. 3 through 6, the method of preventing beat stripes in the FM demodulating system conventionally used in the MUSE (Multiple Sub-Nyquist Sampling Encoding) VTR (Video Tape Recorder) will be described below.

FIG. 3 is a block diagram indicating a schematic structure of an FM modulating/demodulating system of a conventional MUSE.VTR. An inputted MUSE signal, to which a negative pole synchronization signal and a reference burst signal are added in a signal processing circuit 31 and the time base compression is applied, is then FM modulated in FM modulator 32 having an AFC (Automatic Frequency Control) circuit to be recorded in magnetic tape 35 through a recording amplifier 33 and a magnetic head. Various kinds of timing pulses necessary for operations of signal processing circuit 31 and FM modulator 32 are produced by a timing pulse generator 34 on the basis of the MUSE signal.

A MUSE signal, in which positive pole synchronization is introduced, cannot be recorded on magnetic tape as it is (refer to FIG. 4 (a)). In order to make a MUSE signal recordable on magnetic tape, as shown in FIG. 4 (b) for example, the MUSE signal is time-base compressed to 9/10 times in signal processing circuit 31 for every period of the horizontal synchronizing signal. The time-base compressed MUSE signal, in which a negative pole synchronizing signal and a reference burst signal are inserted into a blanking time period (about 2.9 μsec) caused by the time-base compression, is recorded on magnetic tape 35. The arrows in FIGS. 4 (a), (b) indicate phases at which the positive pole synchronization is used. On the other hand, in reproducing, the jitter correction of the reproduced signal is executed in a TBC (Time Base Correct) circuit 43 on the basis of the negative pole synchronization signal and the reference burst signal, and then the time-base expansion process of 10/9 times is applied to the reproduced signal in a time base expansion circuit 44 to reproduce an original MUSE signal.

The band of the MUSE signal provided for use in signal processing circuit 31 is 8.1 MHz, but as a result of the time base compression process of 9/10 times, the required bandwidth becomes 9 MHz. Accordingly, as shown in FIG. 5 (a), when the carrier is FM-modulated with a MUSE signal in which a modulation frequency $f_P$ of 9 MHz is superimposed upon the mid gray level to be recorded on magnetic tape 35, the spectrum of the FM carrier becomes as shown in FIG. 5 (b) in used the process of FM demodulation in reproducing. That is to say, in reproducing, the recorded information is picked up by the magnetic head from magnetic tape 35, which is provided as an input to an equalizer 37 through a head amplifier 36. The spectrum of the FM carrier provided as an output from equalizer 37 is shown in FIG. 5 (b). In the FM modulation parameters, the frequency of the center carrier $F_C$ is set at 16 MHz, the frequency deviation $\Delta F$ is set at $\pm 4$ MHz, the input maximum frequency or the modulating frequency $F_P$ is set at 9 MHz, and the modulation index m: is set at 0.44.

The FM carrier outputted from equalizer 37 is provided to a first low-pass filter 38 as shown in FIG. 3. Although the cut-off frequency of the first low-pass filter 38 is defined by the frequency characteristics of an output of the magnetic head, it is defined as 36 MHz for convenience. As shown in FIG. 5 (b), the components of the second lower sideband of the FM carrier ($-2$ MHz, the ratio with respect to the carrier, 2.4%) is folded over into the positive frequency range, and if it is demodulated as it is, it comes into the video signal band (9 MHz). Generally, the band of a demodulated video signal (hereinafter, referred to as demodulated video band) is regarded as extending from $-9$ MHz to $+9$ MHz.

The higher the order of the sideband of the FM carrier is, the smaller its spectral strength becomes, so that the demodulation process should be used after shifting the frequency of the central carrier $F_C$ as high as possible for preventing the beat interference. In order to implement that, conventionally, (a) a frequency doubler of the FM carrier before the FM demodulating process, and (b) a pulse count type demodulator with a doubler function, for example, are introduced and cascade-connected for quadruple demodulation of the FM carrier.

As shown in FIG. 3 for example, an output of first low-pass filter 38 is provided to doubler 39 as an input, where the frequency of the FM carrier is doubled. By the doubling process by doubler 39, as shown in FIG. 5 (c), the modulation parameters of the FM carrier are converted, that is, the frequency of the center carrier $F_{C2}$ is converted into 32 MHz, the frequency deviation $\Delta F_2$ into $\pm 8$ MHz, and the modulation index $m_2$ into 0.89, respectively. Accordingly, the second lower side band of the FM carrier is converted into 14 MHz, which is out of the demodulation video band (10 MHz). Accordingly, the beat interference does not occur. However, each component of the third lower sideband (5 MHz, the ratio with respect to the carrier is 1.2%, $-38$ dB), and the fourth lower sideband ($-4$ MHz, the ratio with respect to the carrier is 0.15%, $-56$ dB) of the FM carrier invades the demodulated video band. Therefore, for cutting off each component of the third lower sideband and the fourth lower sideband of the FM carrier, as shown in FIG. 3, a high-pass filter 40 is provided. The cut-off frequency of high-pass filter 40 is 10 MHz or more. An output of high-pass filter 40 is provided to a frequency-doubling FM demodulator 41 of the pulse count type (hereinafter, referred to as a pulse count type FM demodulator) to be demodulated.

The output of the pulse count type FM demodulator 41 includes, besides the demodulated video signal, a doubled FM carrier of the center carrier $F_C$, the frequency deviation $\Delta F$, and the modulation index $m_1$, respectively, similarly to the above-mentioned doubler 39. Then, the FM carrier component is provided as an output as it is mixed with demodulated video signal component. Therefore, for eliminating the main FM carrier components and extracting a video signal, a second low-pass filter 42 is provided. That is, as shown in FIG. 3, an output of pulse count type FM demodulator 41 is sent to the second low-pass filter 42. However, a part of the lower sideband of the FM carrier then gets into the demodulation video band, and if the level is higher than an allowable threshold, a picture quality deterioration due to the beat interference occurs.

On the other hand, when the FM carrier is quadruple demodulated by the cascade connection of doubler 39 and pulse count type FM demodulator 41, in the modulation parameters of the FM carrier, the frequency of the main carrier $F_{C4}$ is converted into 64 MHz, the frequency deviation $\Delta F_4$ into $\pm 16$ MHz, and the modulation index $m_4$ is into about 1.78. Accordingly, what is present in the demodulation video band is the seventh lower sideband of the FM carrier (1 MHz, the ratio with respect to carrier is about 0.01%), and the beat stripes are less than the detectable threshold so as not to be visible (refer to FIG. 5 (e)). When such an ideal operation occurs, even if the frequency of the center carrier $F_C$ of the FM modulation is decreased to 12 MHz, the fifth lower sideband (3 MHz, the ratio with respect to carrier is 0.4%) of the FM carrier which causes a problem in quadruple multiplication demodulation is at around the level of a detectable limit of beat stripes. Therefore, the pulse count type FM demodulator 41 for preventing beat stripes becomes unnecessary.

In an analog multiplier for configuring a doubler, which is of wide-band, and generally available at the present time, the output considerably includes error or spurious components due to leakage from the input FM carrier and the like. That is to say, as shown in FIG. 5 (d), the leak component $F_C'$ from the input FM carrier generally exists in an output of the doubler 39, which is about 20% of the center carrier component $F_C 2$ multiplied by doubler 39. In this case, the first lower sideband (7 MHz, the ratio with respect to leak carrier is 21%) of the leak component reaches 4% of the doubled center carrier component, which causes beat stripes.

Next referring to FIG. 6, the conditions of satisfying the demodulation in the pulse count type FM demodulator 41 will be described below. A monomultivibrator (not shown) is triggered at the zero cross point of an input carrier, and the output pulses (pulses shown in FIG. 6 (a)-(c)) are averaged by the second low-pass filter 42 to demodulate a video signal.

The strict condition of satisfying the doubling demodulation in pulse count type FM demodulator 41 is that the inputted FM carrier includes no even number higher harmonic distortion component, especially the second higher harmonic distortion component, and no lower harmonic distortion component, as shown in FIG. 6 (a). That is to say, as shown in that figure, when the intervals of zero cross points in the FM carrier are equal (the zero cross point of the basic wave carrier and the zero cross point of the input carrier coincide with each other), there is no leak component from the input carrier, which reduces the lower side band component mixed in the FM demodulation video band. In FIG. 6

(a), for convenience, the waveform of the input FM carrier is designated by a solid line and the waveform of the basic wave carrier is designated by a broken line.

On the other hand, when the input FM carrier includes the second higher harmonic distortion component, for example, as shown in FIG. 6 (b), the intervals among zero cross points are not equal (zero cross points of the basic wave carrier, zero cross points of the second higher harmonic distortion and zero cross points of the input carrier all differ), and the input leak component is increased/decreased depending on the degree to which extent the intervals between zero cross points differ from an equal interval. Also, when the center carrier $F_{C2}$ which is multiplied by 2 by doubler 39 includes leak component $F_C'$ (½ lower harmonic distortion component) from the input FM carrier which is not multiplied by 2 (refer to FIG. 6 (c)), similar to the above, the intervals between zero cross points are not equal, so that the leak component is increased or decreased depending on to which extent intervals between zero cross points differ from the equal interval.

The spectrum of the leak component $F_C'$ (refer to FIG. 5 (d)) is converted as shown in FIG. 5 (f) by pulse count system FM demodulator 41, and the third lower sideband (5 MHz, the ratio with respect to leak carrier is 1.4%) of the leak component $F_C'$ from the input carrier is present the FM demodulation video band. In addition, in pulse count system FM demodulator 41, there occur the cross modulation of upper and lower higher harmonic spectrum of the main carrier and the cross modulation of respective higher harmonics of the main carrier and the above leak component. Among them, by the cross modulation of the second lower sideband of the main carrier $F_{C2}$ (14 MHz, the ratio with respect to the main carrier is 9%) and the 20% leak component $F_C'$ (16 MHz, the ratio with respect to the main carrier is 20%), a 2 MHz component (the ratio with respect to the main carrier is $9 \times 20/(2 \times 100)$ %=0.9%) is produced, resulting in occurrence of the beat stripes. In order to avoid the occurrence, an output of doubler 39 is supplied to a high-pass filter 40 with a cut-off frequency of 14 MHz. The leak component $F_C'$ is attenuated by high-pass filter 40 to prevent the occurrence of beat stripes.

However, in the above-described conventional structure, the modulation index $m_1$ is large and the spectral spread of the FM carrier spectrum into the upper/lower sidebands is large. Accordingly, when a portion of the lower sidebands of the FM carrier spectrum is cut-off by high-pass filter 40, the upper/lower sidebands are unbalanced, so that inverted white peaks are apt to be caused in an FM demodulation output. Accordingly, it is possible to prevent the inverted white peaks by reducing the spectral spread of the upper/lower sidebands by making the modulation index $m_1$ small to suppress the frequency deviation $\Delta F$ to around ±2 MHz. However, another problem arises in improving the SN ratio of a demodulated video signal.

Also, providing high-pass filter 40 for preventing beat stripes results in an increase in cost as well as making the structure of an apparatus more complex.

SUMMARY OF THE INVENTION

Accordingly, it is an object of the present invention to provide a simple and low-priced magnetic reproducing apparatus and a magnetic recording/reproducing apparatus capable of preventing beat stripes or moiré without using a high-pass filter for cutting off a part of a lower sideband of FM carrier spectrum.

A magnetic reproducing apparatus according to the present invention reproduces a video signal from a magnetic recording medium in which a carrier FM-modulated with the video signal is recorded. In recording, the phase of the FM carrier is reset to a reference phase at a leading edge of every horizontal synchronizing pulse during every period of the horizontal synchronizing pulse width in the video signal and fixed to the above reference phase. A magnetic reproducing apparatus according to the present invention includes pick-up means for picking up an FM carrier from a magnetic recording medium, and an FM demodulating means for FM-demodulating the FM carrier picked up and converting the same into a video signal. The FM demodulating means includes multiplying means for multiplying by $2^M$ (M is a positive integer) the frequency of the picked up FM carrier, and an FM demodulator with a multiplying function for FM-demodulating an output of the multiplying means to convert the same into a video signal having a frequency further multiplied by $2^N$ (N is a positive integer). The output of the multiplying means is directly supplied to the FM demodulator with a multiplying function, and a high-pass filter is not always provided between the multiplying means and the FM demodulator with a multiplying function.

A magnetic recording/reproducing apparatus in accordance with the present invention includes a recording system for recording a video signal in a magnetic recording medium and a reproducing system for reproducing the video signal from the magnetic recording medium. The recording system includes FM modulating means, a reset means and magnetic recording means. The FM modulating means provides as an output an FM carrier FM modulated with a video signal. The reset means resets the FM modulating means to a reference phase at a leading or trailing edge of every horizontal synchronizing pulse, during every period of the horizontal synchronizing pulse width in the video signal, and thereby fixes the phase of the FM carrier corresponding to a horizontal synchronizing pulse tip portion (hereinafter called the sync-tip carrier) to the reference phase at every period of the horizontal synchronizing pulse. The magnetic recording means magnetically records the FM carrier with phase fixed in the magnetic recording medium. The reproducing system has the same structure as that of the above-described magnetic reproducing apparatus according to the present invention.

According to the present invention, when recording, the phase of the sync-tip carrier is fixed to a reference phase at the leading edge of a horizontal synchronizing pulse, so that if a part of the FM carrier spectrum leaks into the band of the FM demodulation video signal in reproducing, the interference signal due to the leakage appears as reproduced picture distortion in synchronization with a video signal, so that the degree at which a human being detects interference due to the same can be fairly reduced as compared to the interference due to beat stripes asynchronously drifting with a video signal. As a result, even if the frequency deviation quantity of the FM carrier is increased, without cutting off a part of the lower sideband of the FM carrier spectrum with a high-pass filter, the level of the interference can be suppressed to a degree such as to cause no practical problem. Accordingly, without causing the inverted white peaks in the FM demodulation video signal, the SN ratio of the FM demodulated video signal can be improved. Also, by omitting a high-pass filter, the structure is simplified and the price can be reduced.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 5(a)-5(f) are waveform diagrams of an FM carrier spectrum in each portion of the FM demodulating system shown in FIG. 3.

FIGS. 7(a)-7(f) are waveform diagrams for describing how, when a video signal has a horizontal correlation with respect to a horizontal synchronizing pulse and an FM carrier asynchrously drifts with respect to the horizontal synchronizing pulse as shown by the broken line, the asynchrous beat stripes are produced, and how, when the phase of the FM carrier or the sync-tip carrier is fixed with respect to the horizontal synchronizing pulse as shown by the solid line, a beat stripe component simply distorts the video signal and does not produce the drifting beat stripes or moire.

DESCRIPTION OF THE PREFERRED EMBODIMENTS

Figure 1:
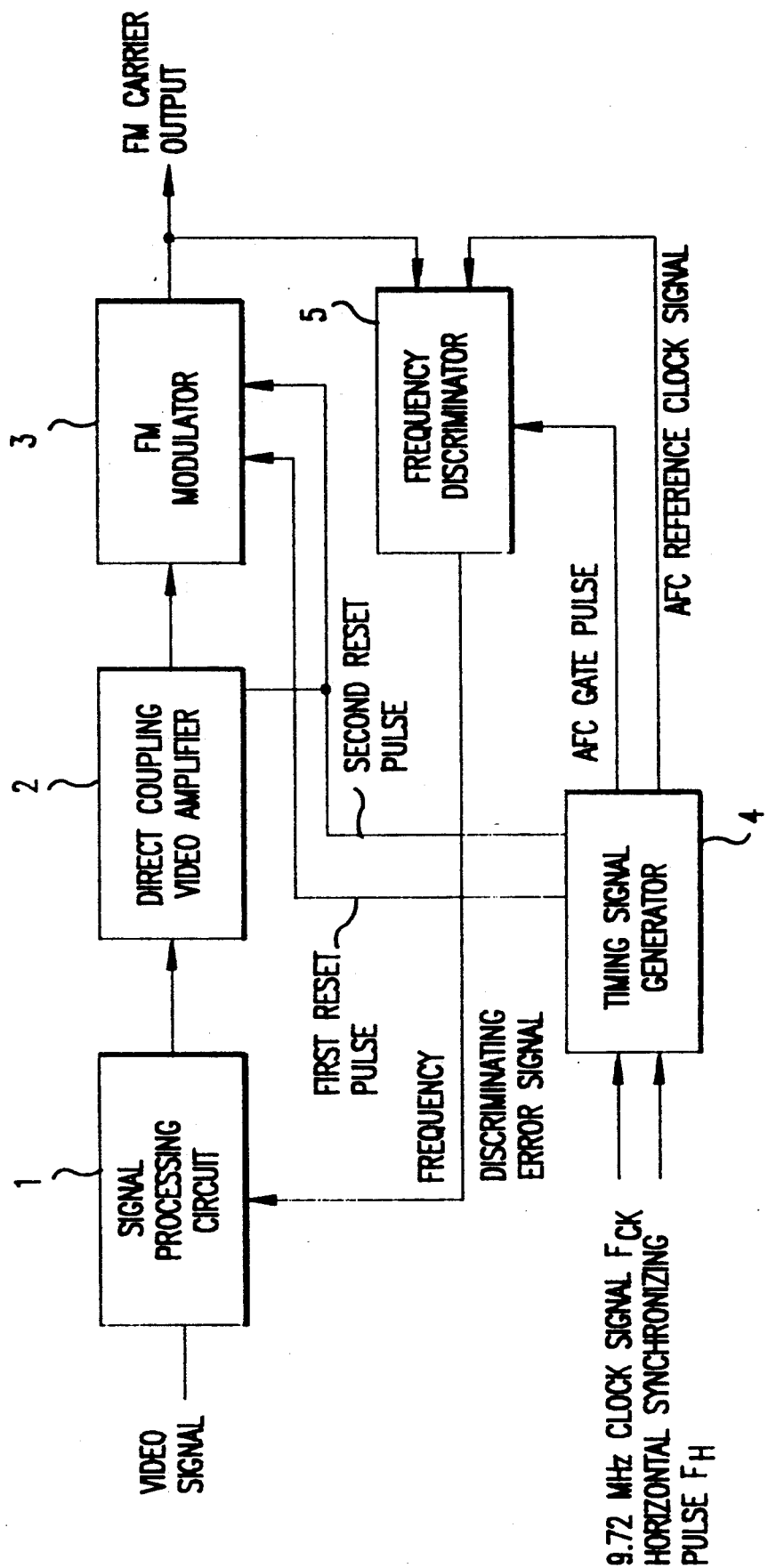
FIG. 1 is a block diagram showing a structure of an FM modulating system in a recording system of a magnetic recording/reproducing apparatus in accordance with one embodiment of the present invention.
Figure 2A:
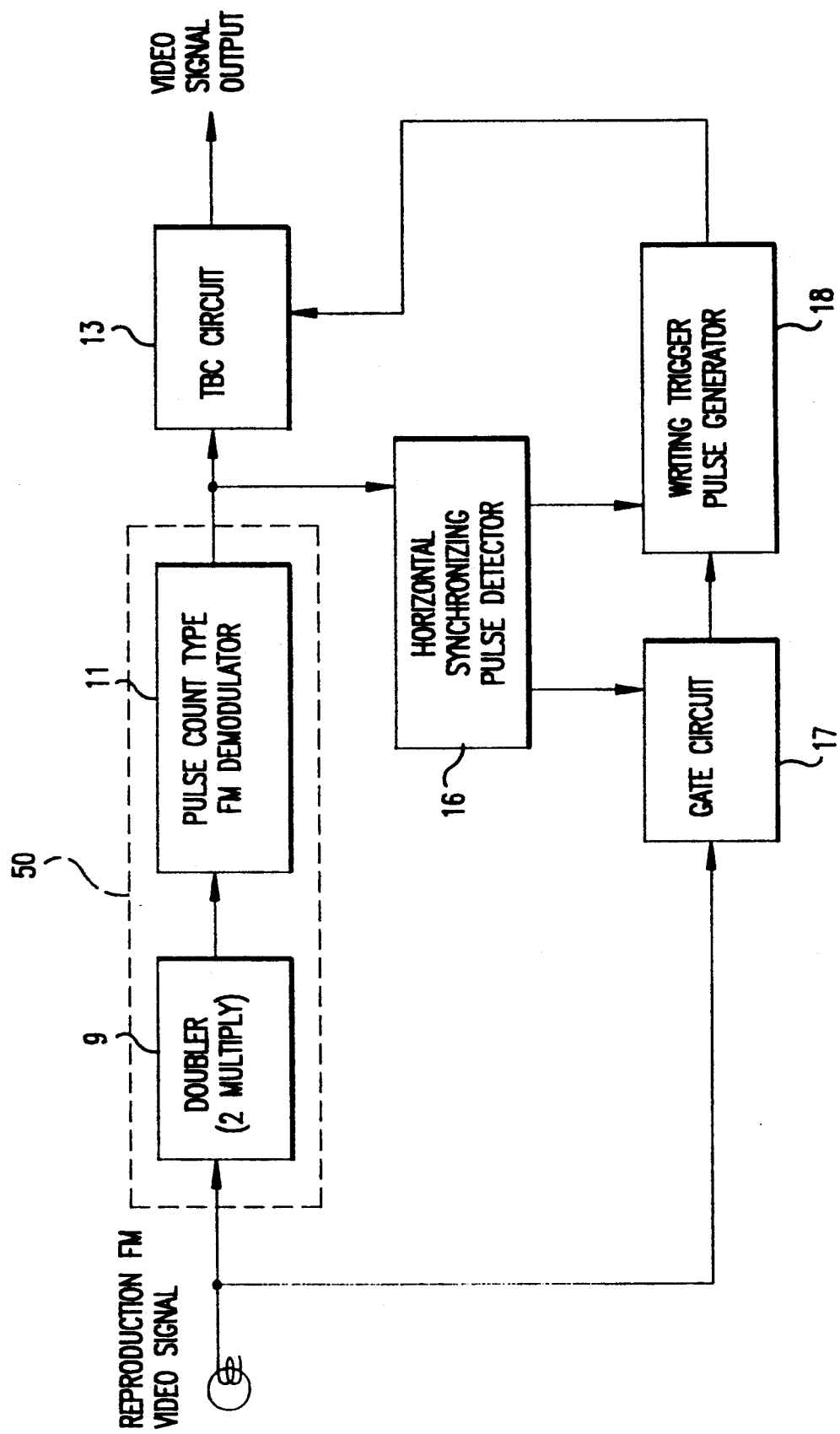
FIG. 2A is a block diagram indicating a principle structure of an FM demodulating system in a reproducing system of a magnetic recording/reproducing apparatus according to one embodiment of the present invention.
Figure 2B:
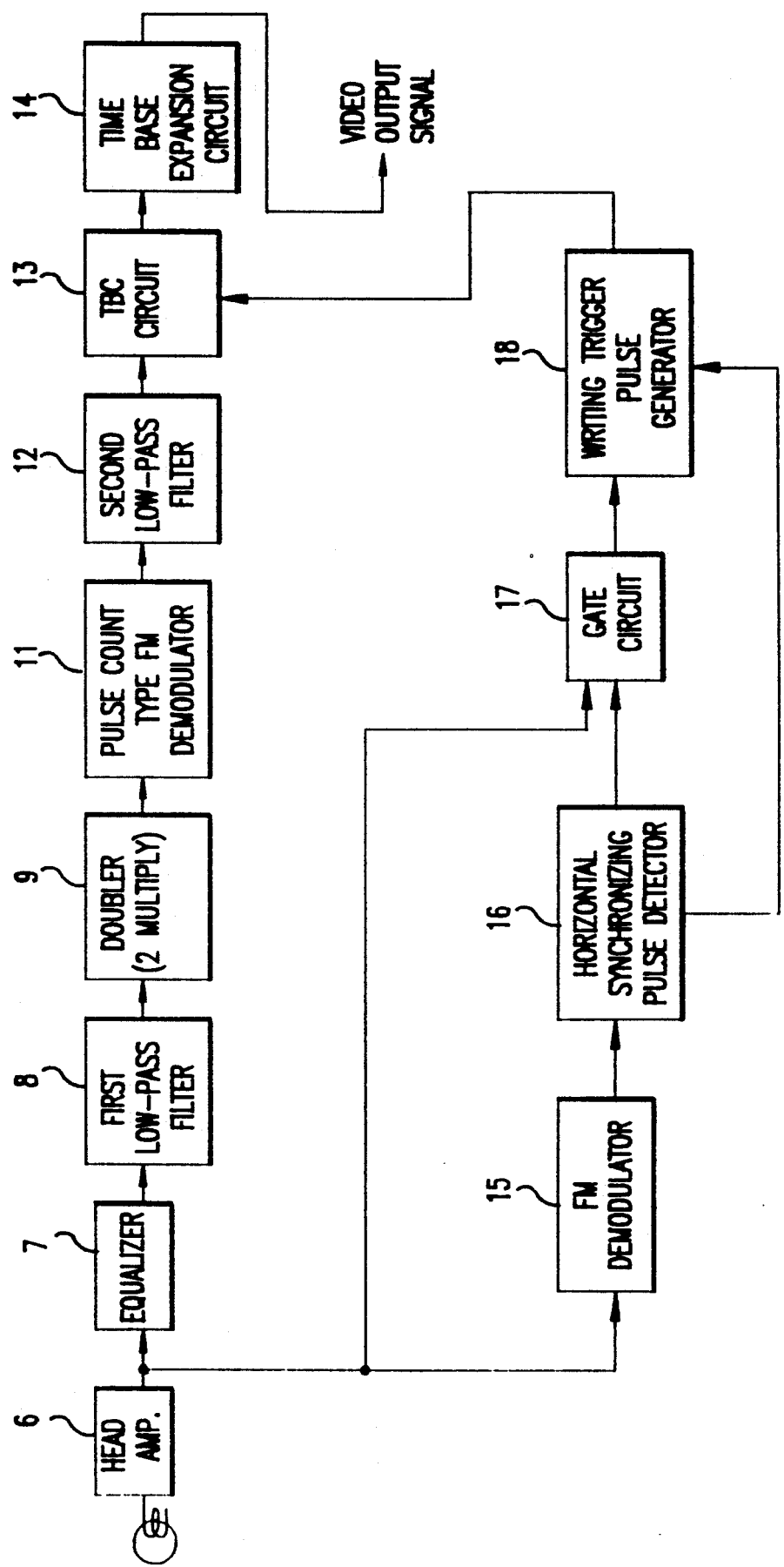
FIG. 2B is a block diagram indicating more practical structure of an FM demodulating system in a reproducing system of a magnetic recording/reproducing apparatus in accordance with one embodiment of the present invention.

Referring to FIGS. 1, 2A and 2B, one embodiment of the present invention will be described below.

FIG. 1 indicates an example of configuring a modulating system, and FIG. 2 indicates an example of configuring a demodulating system.

Referring to FIG. 1, the fact that the phase of the sync-tip carrier is reset to the reference phase at a leading edge of the pulse at every period of the horizontal synchronizing pulse of a video signal to be recorded will be described below.

FIG. 1 is a block diagram showing one example of an FM modulating system in a recording system of a magnetic recording/reproducing apparatus in accordance with one embodiment of the present invention. The FM modulating system mainly includes a signal processing circuit 1, a direct coupling video amplifier 2, an FM modulator 3, a timing signal generator 4, and a frequency discriminator 5 as shown in FIG. 1.

A record video signal (e.g., a MUSE signal) is provided as an input in signal processing circuit 1. An output of signal processing circuit 1 is provided to direct coupling video amplifier 2. Also, a frequency discrimination error signal (lower frequency components including a DC component) is fed back from frequency discriminator 5 to signal processing circuit 1. In signal processing circuit 1, the frequency discrimination error signal is summed up upon the record video signal and furthermore, its high frequency component is emphasized.

In direct coupling video amplifier 2, an output of signal processing circuit 1 is amplified in direct coupling over a broad-band to be sent to FM modulator 3. First and second reset pulses are provided as inputs from timing signal generator 4 to FM modulator 3.

A clock signal $F_{CK}$ of 9.72 MHz, which is generated and locks to an input horizontal synchronizing pulse of an input video signal, is provided to timing signal generator 4, for example. Here, supposing the horizontal frequency to be $F_H$ the condition of $F_{CK}=n\cdot F_H$ ($n=$ an integer) holds. Timing signal generator 4 outputs an AFC reference clock signal, an AFC gate pulse and first and second reset pulses on the basis of these signals $F_{CK}$ and $F_H$. The above-mentioned AFC reference clock signal has a frequency (9.72 MHz) the same as the clock signal $F_{CK}$ with the frequency equal to the sync-tip carrier frequency. The AFC gate pulse is a signal for commanding frequency discriminator 5 to provide a frequency comparison for a period corresponding to the tip portion of the horizontal synchronizing pulse of a recording video signal. The first and second reset pulses are for resetting the phase of the sync-tip carrier to the reference phase.

The pulse for resetting the phase of the sync-tip carrier of FM modulator 3 may be originally a single reset pulse. However, when the reset pulse is a single one, a rapid change in the phase of FM carrier is caused by the resetting process to produce large pulse noise at the transient of resetting when FM-demodulating, so that two or more reset pulses are more more preferable for moderating the phase change. That is to say, when two reset pulses are employed, as in the present embodiment, timing signal generator 4 outputs a first reset pulse in the vicinity of the reference phase and resets the phase of the FM carrier corresponding to the above-mentioned tip portion, and outputs the second reset pulse when the reference phase is reached and resets the phase of the sync-tip carrier to a definite phase, which is equivalent to the reference phase with a phase difference of $2\pi N$ (N is integer). By this operation, the sync-tip carrier can be surely reset at that reference phase with high accuracy, so that the transient distortion (pulse noise) produced in the FM demodulation video signal can be reduced.

The output of FM modulator 3 is sent to frequency discriminator 5. Frequency discriminator 5 compares the frequency of the AFC reference clock signal and the frequency of the FM carrier provided as an output from FM modulator 3 for the above-mentioned predetermined period.

In the above structure, the frequency of the FM carrier output and the frequency of the AFC reference clock signal are compared in frequency discriminator 5, and a frequency discrimination error signal corresponding to the frequency difference is fedback to signal processing circuit 1. In signal processing circuit 1, the frequency discrimination error signal is summed up upon the record video signal and the high band of the video signal is emphasized. An output of signal processing circuit 1, after amplified with an appropriate amplification ratio by the DC coupling video amplifier, is superimposed upon the base bias voltage of FM modulator 3. Then, with FM modulator 3, the d.c. component of the base bias voltage increases (or decreases), and the frequency of the FM carrier increases (or decreases) accordingly. By this, operation the FM carrier modulated with the video signal is provided as an output from FM modulator 3. Then, by the first and second reset pulses from timing signal generator 4, the sync-tip carrier is reset to the reference phase with high accuracy, with the result that the transient distortion caused by resetting is reduced.

In place of the modulating system shown in FIG. 1, a modulating system as disclosed in Japanese Patent Laying-Open No. 63-185177 or 63-274290 may be employed in the present invention.

Next, referring to FIG. 2A, an example of the FM demodulating operation in reproducing will be described below.

An FM carrier reproduced by the magnetic head is supplied to a doubler 9 (square multiplier) in an FM demodulating portion 50 and a gate circuit 17. In the FM demodulating portion 50, an output of doubler 9 is directly inputted to a pulse count type FM demodulator 11. That is to say, in the reproducing system of FIG. 2A, a high-pass filter 40 can be omitted, which filter was located between doubler 39 and pulse count type FM demodulator 41 for preventing beat stripes in a conventional system (refer to FIG. 3).

An output of FM demodulating portion 50, or a video signal which is FM-demodulated, is provided as a video signal through TBC (Time Base Correct) circuit 13, and also is provided to horizontal synchronizing pulse detector 16. Horizontal synchronizing pulse detector 16 separates a horizontal synchronizing pulse from the FM demodulated video signal. The separated horizontal synchronizing pulse is supplied to gate circuit 17 and write-trigger pulse generator 18.

Gate circuit 17 gates the FM carrier in synchronization with a leading edge of the horizontal synchronizing pulse thereby to extract the sync-tip carrier portion from the FM carrier as a burst signal. Write-trigger pulse generator detects a specific zero cross point of the burst signal based on a trailing edge of the horizontal synchronizing pulse and supplies a write-trigger pulse to TBC circuit 13 based on the detected result. In synchronization with the write-trigger pulse, the FM-demodulated video signal and a portion of the lower sideband of the FM carrier spectrum which invades the demodulation video band are written into a memory of TBC circuit 13.

Next, on the basis of FIG. 2B, a more practical example of the FM demodulating operation in reproducing will be described below. As differences from the principle circuit configuration shown in FIG. 2A, the following two items (1) and (2) are generally pointed out. Except for the following two items, it is substantially the same as the circuit configurations of FIGS. 2A and 3, so that the detailed description thereof is not repeated here.

Figure 3:
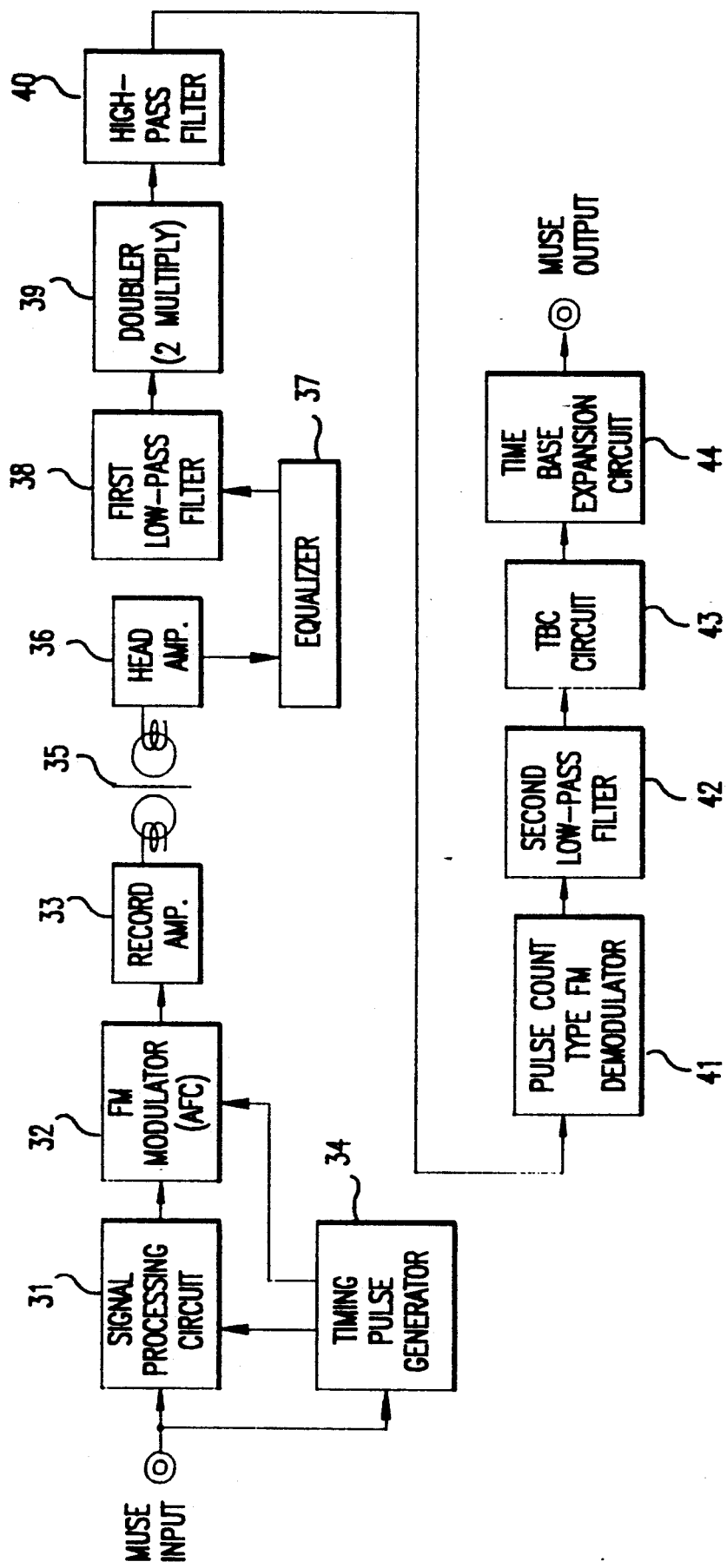
FIG. 3 is a block diagram indicating a structure of an FM modulating system in a recording system and an FM demodulating system in a reproducing system in a conventional magnetic recording/reproducing apparatus.
Figure 4A:
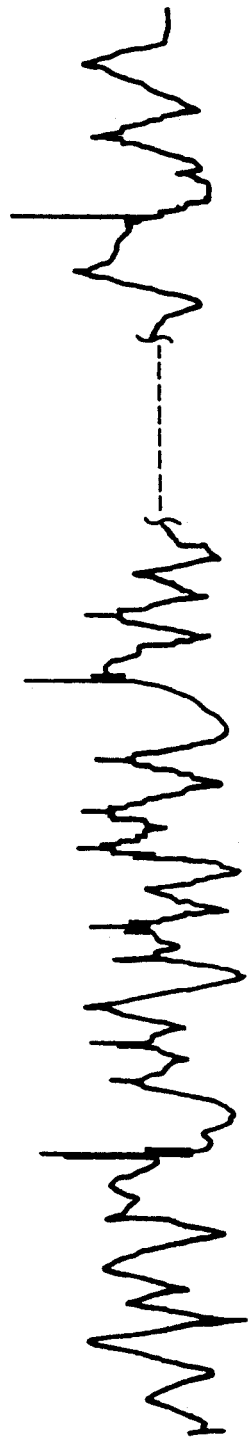
FIGS. 4(a) and 4(b) are waveform diagrams of an input and an output of the signal processing circuit shown in FIG. 3.
Figure 4B:
Figures 6A, 6B, 6C:
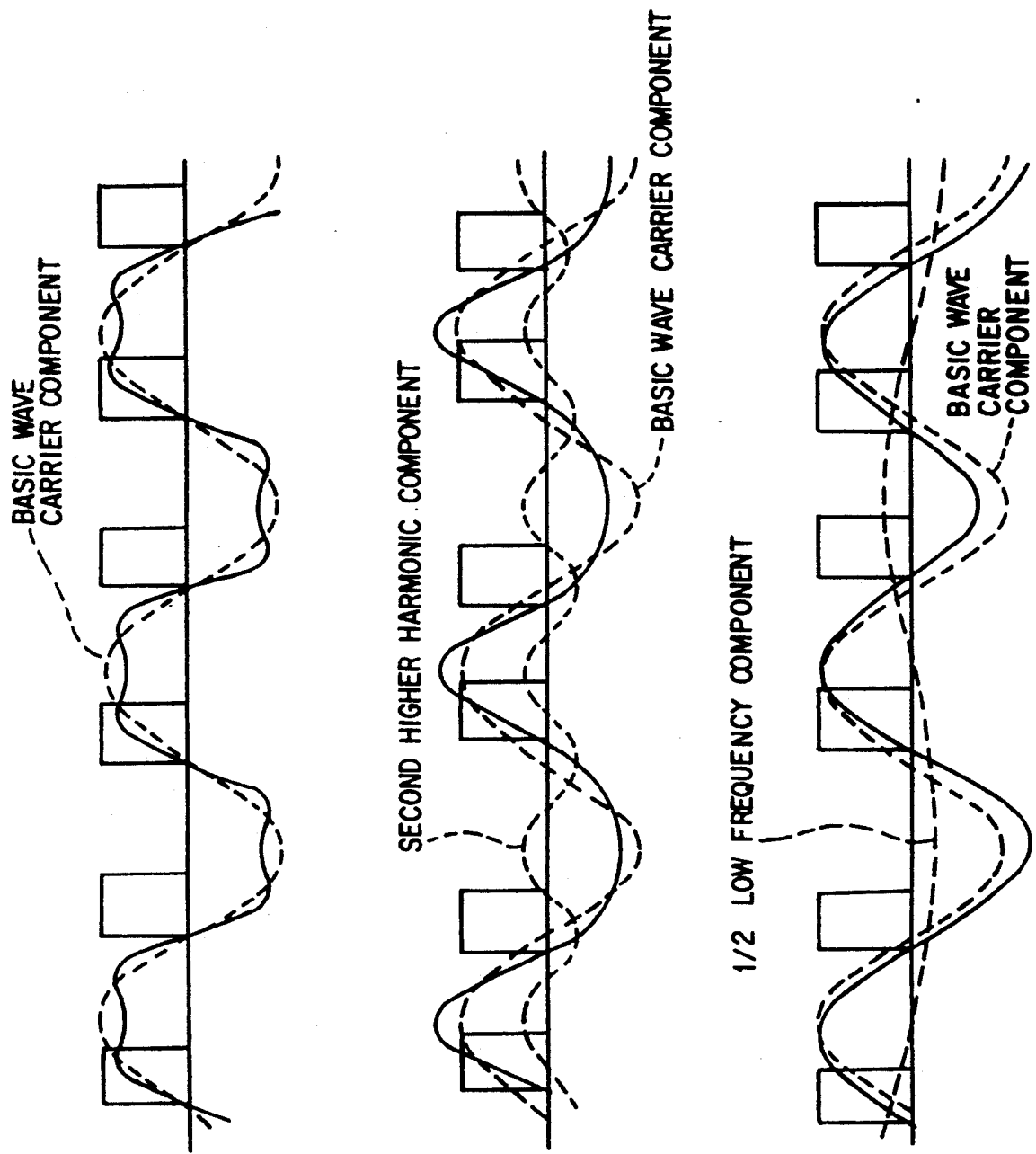
FIGS. 6(a)-6(c) are waveform diagrams for describing a frequency-doubling operation in the pulse count type FM demodulator shown in FIG. 3.

(1) Similar to the conventional embodiment shown in FIG. 3, a head amplifier 6, an equalizer 7, a first low-pass filter 8, a second low-pass filter 12 and a time base expansion circuit 14 are provided.

(2) An FM demodulator 15 dedicated to a burst signal processing system is provided because the frequency characteristics of FM demodulator 11 of the video signal demodulating system has a broad-band and also the characteristics are changed by equalizer 7, so that sags are produced at leading and trailing edges of the horizontal synchronization pulse, which sags are not appropriate as the horizontal synchronization time reference. Furthermore, since FM demodulator 15 may have a relatively narrow band, a single tip IC which is generally used with low cost existing home VTRs has enough performance.

As described above, by resetting the phase of the sync-tip carrier at every leading edge of a horizontal synchronizing pulse during every horizontal synchronizing pulse width, the FM carrier can be synchronized with a video signal on a screen and has a horizontal correlation with the demodulated video signal. Accordingly, a portion of the lower sideband of the FM carrier spectrum invading the demodulation video band can be apparently in a still state on the screen.

The sensitivity of a human being to detect interference due to beat stripes asynchronouly drifting on the screen is extremely high. Even if the amplitude of an undesired signal which causes beat stripes is 1/200 times of a video signal amplitude, the beat stripes are detectable. Accordingly, it is said that the permittable limit of the DU ratio in a home video is around 35 dB. However, when the beat stripes stand still on the screen, the beat stripes appear as reproduced picture distortion, so that the detection sensitivity by a human being is extremely reduced. Accordingly, even if still beat stripes of about 1/20 comes into the reproduced picture, the picture stability may not be degraded. Accordingly, without using a high-pass filter conventionally connected to an output of a doubler, it does not cause a trouble, and also the frequency deviation $\Delta F$ is increased to expand the FM spectral band, and even if a portion of the lower sideband components invades the video band, the beat interference is not caused.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A magnetic reproducing apparatus for reproducing a video signal from a magnetic recording medium on which an FM carrier modulated with said video signal is recorded, the phase of a portion of the FM carrier on which a sync-tip is carried being reset in recording during every period of a horizontal synchronizing pulse width in said video signal to a reference phase at a leading edge of the horizontal synchronizing pulse in said video signal, the leading edge being fixed to the reference phase during every period of the horizontal synchronizing pulse width, said apparatus comprising:

pick up means for picking up said FM carrier from said magnetic recording medium; and FM demodulating means for FM demodulating the FM carrier picked up by said pick up means to produce said video signal therefrom; wherein said FM demodulating means comprises
frequency-multiplying means for multiplying by M, where M is a positive integer, the frequency of the FM carrier picked up by said pick up means, and an FM demodulator having a frequency-doubling function for providing as an output an FM carrier component, in which the FM carrier frequency is further multiplied by $2^N$, where N is a positive integer, and a demodulated video component which are superimposed, when FM-demodulating an output of said multiplying means, the output of said multiplying means being directly inputted to said FM demodulator having the frequency-doubling function.

2. The magnetic reproducing apparatus according to claim 1, wherein said multiplying means comprises a frequency doubler circuit for doubling the frequency of the FM carrier picked up by said pick up means, and said FM demodulator also has a frequency-doubling function for superimposing and providing as an output a quadruple multiplied FM carrier component, in which the FM carrier frequency of the output of said frequency-doubling circuit is further doubled, and a demodulated video signal.

3. The magnetic reproducing apparatus according to claim 1, further comprising a jitter detecting means for detecting jitter in the portion of the FM carrier on which the sync-tip is carried, which FM carrier is picked up by said pick up means; and time base correcting means for correcting the time axis of the reproduced video signal provided as an output from said FM demodulating means in response to a detection output of said jitter detecting means and thereby removing a jitter component from the video signal.

4. The magnetic reproducing apparatus according to claim 3, wherein said jitter detecting means comprises horizontal synchronizing pulse detecting means for detecting and providing as an output a horizontal synchronizing pulse from an output of said FM demodulating means, burst signal extracting means responsive to the horizontal synchronizing pulse provided from said horizontal synchronizing pulse detecting means for extracting a part of the portion of the FM carrier on which the sync-tip is carried, which FM carrier is picked up by said pick up means, as a reference burst signal, and time base control signal detecting means for outputting a time base control signal for said time base correcting means by detecting a predetermined zero cross point in said reference burst signal based on a trailing edge of the horizontal synchronizing pulse provided from said horizontal synchronizing pulse detecting means.

5. The magnetic reproducing apparatus according to claim 3, wherein said jitter detecting means comprises horizontal pulse dedicated FM demodulating means having a narrow-band primarily for obtaining a horizontal synchronizing pulse by demodulating the FM carrier picked up by said pick up means, horizontal synchronizing pulse detecting means for accurately detecting and outputting the horizontal synchronizing pulse from an output of said horizontal pulse dedicated FM demodulating means, burst signal extracting means responsive to the horizontal synchronizing pulse provided from said horizontal synchronizing pulse detecting means for extracting a part of the FM carrier corresponding to a horizontal synchronizing pulse tip portion from the output of said pick up means as a reference burst signal, and time base control signal outputting means for outputting a time base control signal for said time base correcting means by detecting a predetermined zero cross point in said burst signal based on a trailing edge of the horizontal synchronizing pulse provided from said horizontal synchronizing pulse detecting means.

6. A magnetic recording/reproducing apparatus having a recording system for recording a video signal in a magnetic recording medium and a reproducing system for reproducing the video signal from the magnetic recording medium, wherein said recording system comprises, FM modulating means for FM modulating a carrier with said video signal and outputting a FM carrier, rest means for resetting the portion of the FM carrier on which said sync-tip is carried to a reference phase at a leading edge of a horizontal synchronizing pulse during every period of the horizontal synchronizing pulse width in said video signal and thereby fixing the phase of the leading edge of the portion of the FM carrier on which the sync-tip is carried at the reference phase during every period of the horizontal synchronizing pulse width, magnetic recording means for magnetically recording said FM carrier the portion of the FM carrier on which said sync-tip is carried with a fixed phase on to said magnetic recording medium, said reproducing system comprise, pick up means for picking up said FM carrier from said magnetic recording medium, and FM demodulating means for FM-demodulating the FM carrier picked up by said pick up means for producing said video signal therefrom, and said FM demodulating means comprises, multiplying means for multiplying by $2^M$, where M is a positive integer, the frequency of the FM carrier picked up by said pick up means, and an FM demodulator having a frequency-doubling function for superimposing and outputting the FM carrier component, in which the FM carrier frequency is further multiplied by $2^N$, where N is a positive integer, and the demodulated video component when FM demodulating the output of said multiplying means, the output of said multiplying means being directly inputted to said FM demodulator having a multiplying function.

7. The magnetic recording/reproducing apparatus according to claim 6, wherein said multiplying means comprises a frequency-doubling circuit for doubling the frequency of the FM carrier picked up by said pick up means, and said FM demodulator also having a frequency-doubling function for superimposing and outputting a quadruple multiplied FM carrier component, in which the FM carrier frequency of the output of said frequency-doubling circuit is further doubled, and a demodulated video component.

8. The magnetic recording/reproducing apparatus according to claim 6, wherein
said reproducing system further comprises,
jitter detecting means for detecting jitter in the portion of the FM carrier on which the sync-tip is carried, which FM carrier is picked up by said pick up means, and
time base correcting means for correcting a time axis of the video signal outputted from said FM demodulating means in response to a detection output of said jitter detecting means and thereby removing a jitter component from the video signal.

9. The magnetic reproducing apparatus according to claim 8, wherein
said jitter detecting means comprises
horizontal synchronizing pulse detecting means for detecting and outputting a horizontal synchronizing pulse from the output of said FM demodulating means,
burst signal extracting means responsive to the horizontal synchronizing pulse provided from said horizontal synchronizing pulse detecting means for extracting a portion of the FM carrier on which the sync-tip is carried, which FM carrier is picked up by said pick up means, as a reference burst signal, and
time base control signal output means for outputting a time base control signal for said time base correcting means by detecting a predetermined zero cross point in said reference burst signal based on a trailing edge of the horizontal synchronizing pulse provided from said horizontal synchronizing pulse detecting means.

10. The magnetic reproducing apparatus according to claim 8, wherein
said jitter detecting means comprises
horizontal pulse dedicated FM demodulating means having a narrow-band for demodulating the FM carrier picked up by said pick up means primarily to obtain a horizontal synchronizing pulse,
horizontal synchronizing pulse detecting means for accurately detecting and outputting the horizontal synchronizing pulse from the output of said horizontal pulse dedicated FM demodulating means,
burst signal extracting means responsive to the horizontal synchronizing pulse provided from said horizontal synchronizing pulse detecting means for extracting a portion of the FM carrier on which the sync-tip is carried from the output of said pick up means as a reference burst signal, and
time base control signal outputting means for outputting a time base control signal for said time base correcting means by detecting a predetermined zero cross point in said burst signal based on a trailing edge of the horizontal synchronizing pulse provided from said horizontal synchronizing pulse detecting means.

* * * * *